United States Patent
Drennen et al.

(10) Patent No.: US 9,995,351 B2
(45) Date of Patent: Jun. 12, 2018

(54) WRAP SPRING PARK BRAKE SYSTEM, APPARATUS AND METHOD

(71) Applicant: GOODRICH CORPORATION, Charlotte, NC (US)

(72) Inventors: David Drennen, Bellbrook, OH (US); Harald Klode, Centerville, OH (US); Kevin Rehfus, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days. days.

(21) Appl. No.: 15/012,412

(22) Filed: Feb. 1, 2016

(65) Prior Publication Data
US 2016/0146273 A1 May 26, 2016

Related U.S. Application Data

(62) Division of application No. 13/933,757, filed on Jul. 2, 2013, now Pat. No. 9,297,430.

(51) Int. Cl.
| | | |
|---|---|---|
| *F16D 49/02* | (2006.01) | |
| *F16D 65/14* | (2006.01) | |
| *B60T 1/06* | (2006.01) | |
| *F16D 125/18* | (2012.01) | |
| *F16D 121/20* | (2012.01) | |

(52) U.S. Cl.
CPC ............. *F16D 49/02* (2013.01); *B60T 1/062* (2013.01); *F16D 65/14* (2013.01); *F16D 2121/20* (2013.01); *F16D 2125/18* (2013.01)

(58) Field of Classification Search
CPC .......... F16D 55/02; F16D 55/04; F16D 59/00; F16D 59/02; F16D 2065/383; F16D 2121/18; F16D 2121/20; F16D 2121/22; F16D 2121/24; F16D 2121/26; F16D 65/14; F16D 65/18; F16D 65/186; F16D 2055/0075; F16D 2125/18; F16D 2129/065; F16D 49/02; B60T 1/062
See application file for complete search history.

(56) References Cited

U.S. PATENT DOCUMENTS

| | | |
|---|---|---|
| 2,060,878 A | 11/1936 | La Brie |
| 3,601,640 A | 8/1971 | Egawa |
| 3,763,968 A | 10/1973 | Noly |
| 5,931,268 A | 8/1999 | Kingston et al. |
| 6,012,556 A | 1/2000 | Blosch et al. |
| 6,202,804 B1 | 3/2001 | Dropmann |
| 6,471,017 B1 | 10/2002 | Booz |
| 6,679,356 B2 | 1/2004 | Hageman |
| 6,942,072 B2 | 9/2005 | Klode et al. |

(Continued)

FOREIGN PATENT DOCUMENTS

FR 2956888 9/2011

OTHER PUBLICATIONS

Extended European Search Report dated Oct. 21, 2015 in European Application No. 14169598.1.

(Continued)

*Primary Examiner* — Melody M Burch
(74) *Attorney, Agent, or Firm* — Snell & Wilmer, L.L.P.

(57) ABSTRACT

A park brake system for an electric motor actuator is provided. The system may comprise a wrap spring that may rotatably engage the shaft. In this regard, the system may be configured to exert a radial force on a shaft of the electric motor actuator to lock the actuator. Moreover, in various embodiments, the system may be bi-stable.

10 Claims, 8 Drawing Sheets

(56) References Cited

U.S. PATENT DOCUMENTS

| | | |
|---|---|---|
| 7,726,455 B2 | 6/2010 | Benoit |
| 9,297,430 B2 | 3/2016 | Drennen |
| 2004/0060783 A1 | 4/2004 | Severinsson |
| 2015/0008091 A1 | 1/2015 | Drennen |

OTHER PUBLICATIONS

USPTO; Restriction Requirement dated Feb. 26, 2015 in U.S. Appl. No. 13/933,757.
USPTO; Pre-Interview First Office Action dated Jun. 18, 2015 in U.S. Appl. No. 13/933,757.
USPTO; Final Office Action dated Nov. 4, 2015 in U.S. Appl. No. 13/933,757.
USPTO; Notice of Allowance dated Jan. 22, 2016 in U.S. Appl. No. 13/933,757.
Communication pursuant to Article 94(3) EPC dated Apr. 11, 2017 in European Application No. 14169598.1.

WRAP SPRING PARK BRAKE SYSTEM, APPARATUS AND METHOD

CROSS REFERENCE TO RELATED APPLICATIONS

This application is a divisional of, and claims priority to, and the benefit of U.S. Pat. No. 9,297,430 filed Jul. 2, 2013, and entitled "WRAP SPRING PARK BRAKE SYSTEM, APPARATUS AND METHOD," which is incorporated by reference herein in its entirety.

FIELD

The present disclosure relates to braking systems and, more specifically, to a bi-stable wrap spring park brake for use with an electro-mechanical braking system.

BACKGROUND

Typical park brakes or friction brakes consist of a friction disc, which is clamped via a spring between the brake housing and a steel armature plate. The armature plate can be manipulated by providing an electrical current pulse to an electro-magnet and permanent magnet assembly in order to either attract and hold the armature plate away from the friction disc (free state), or, after reversal of the current pulse, release the armature plate and clamp the friction disc (locked state). These systems are associated with regular maintenance to account for wear and contamination.

SUMMARY

In various embodiments, a park brake system may comprise a rotor cup, a magnet, a stator, a spring and a shaft. The magnet may be operatively coupled to the rotor cup. The stator may be configured to actuate the magnet in response to an input. The spring may comprise a first end and a second end. The first end may be operatively coupled to the rotor cup and the second end may be operatively coupled to the stator. The spring may be installable around the shaft.

In various embodiments, an electric motor actuator may comprise a shaft, a spring, a rotor cup a magnet, a stator. The spring may be installable on the shaft. The spring may comprise a first spring tang and a second spring tang. The rotor cup may be rotatably installed about at least a portion of the shaft. The rotor cup may also be configured to receive the first spring tang. The magnet may be coupled to the rotor cup. The stator may comprise a coil. The rotor cup may rotate in response to the coil biasing the magnet. Moreover, the spring may tighten on the shaft in response to the rotor cup rotating in one direction, and loosen on the shaft in response to the rotor cup rotating in the opposite direction.

In various embodiments, a method of operating an electric motor actuator comprising a park brake system is provided. The method may comprise steps including: energizing and monitoring an electric motor actuator; detecting a load on the electric motor actuator; energizing an electric coil assembly in response to the load being above a predetermined threshold; and

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably. Different cross-hatching may be used throughout the figures to denote different parts but not necessarily to denote the same or different materials.

In various embodiments, a brake system may comprise an electro-mechanical actuator ("EMA"). The EMA may be coupled to or otherwise operate a pressure generating device such as, for example, a ball screw, a ram, and/or the like. In operation, the EMA may cause the pressure generating device to move and/or exert a force on other brake system structure such as, for example, a brake disk or pad to exert a stopping force on a wheel or other suitable moving structure. The brake system may also include a park brake feature.

The park brake feature may be used to reduce the load on the EMA when the brake is engaged (e.g., in an idle configuration while waiting for take-off). The park brake feature may also provide brake locking capability, when power is not available to maintain power to the EMA (e.g., in a parked configuration).

Figure 1A:
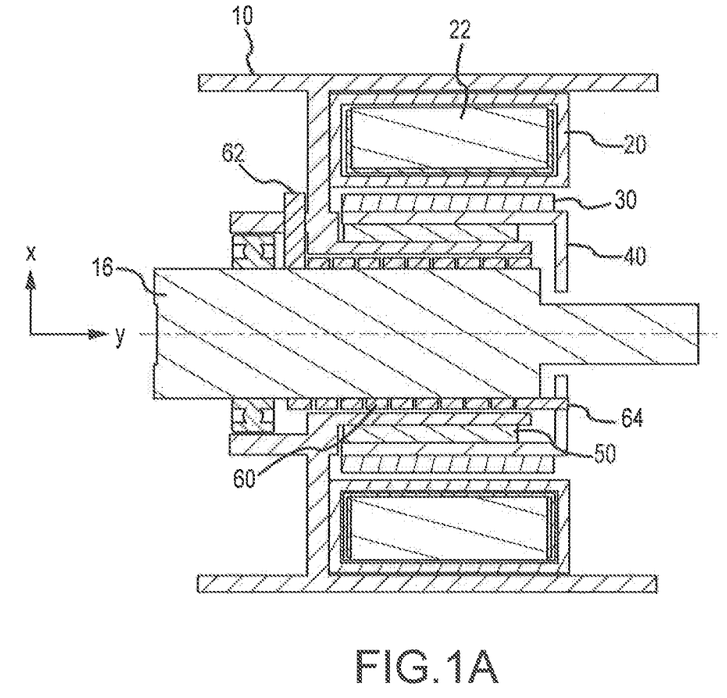
FIG. 1A illustrates a side cross-sectional view of an electric motor actuator in accordance with various embodiments.
Figure 1B:
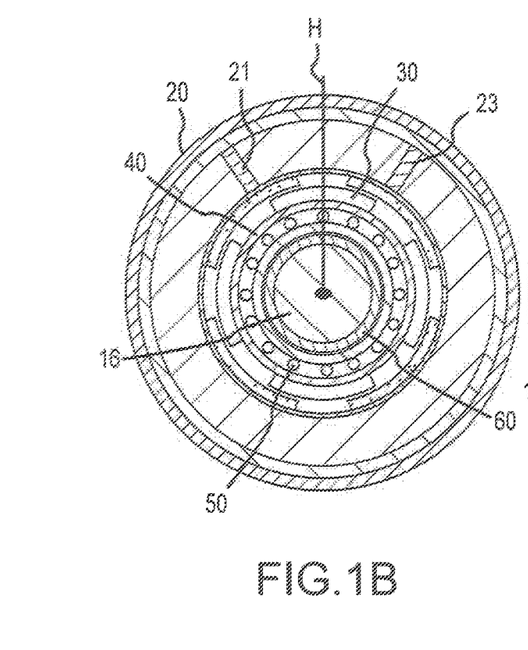
FIGS. 1B-1D illustrate top cross-sectional views of an electric motor actuator in accordance with various embodiments.
Figure 1C:
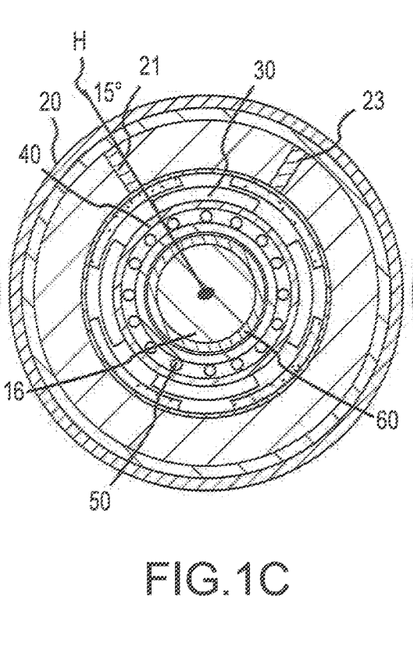
Figure 1D:
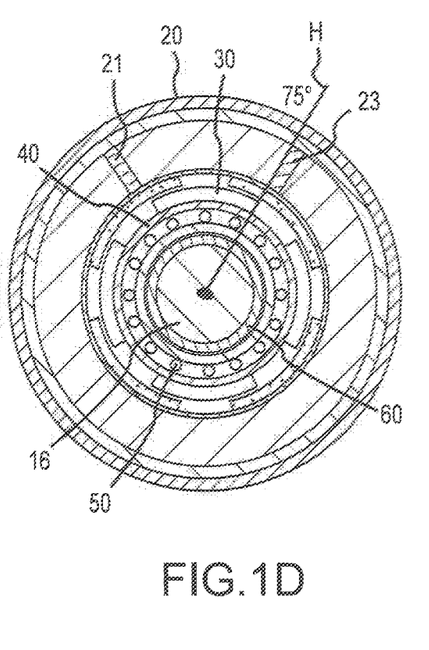

In various embodiments, FIG. 1A illustrates a side cross-sectional view of an exemplary EMA 10 and includes a two dimensional x and y for reference and to aid in description. FIG. 1B-1D illustrate top cross-sectional views of an exemplary EMA 10 and includes a two dimensional x and z for reference and to aid in description. EMA 10 may comprise a shaft 16, stator 20, magnets 30, a rotor cup 40, a bearing 50, and a spring 60. Stator 20 may comprise a coil assembly 22. Coil assembly 22 may be housed within stator 20. Bearing 50 may be any suitable bearing including, for example, a needle bearing and/or any other suitable bearing and/or bushing.

Figure 2:
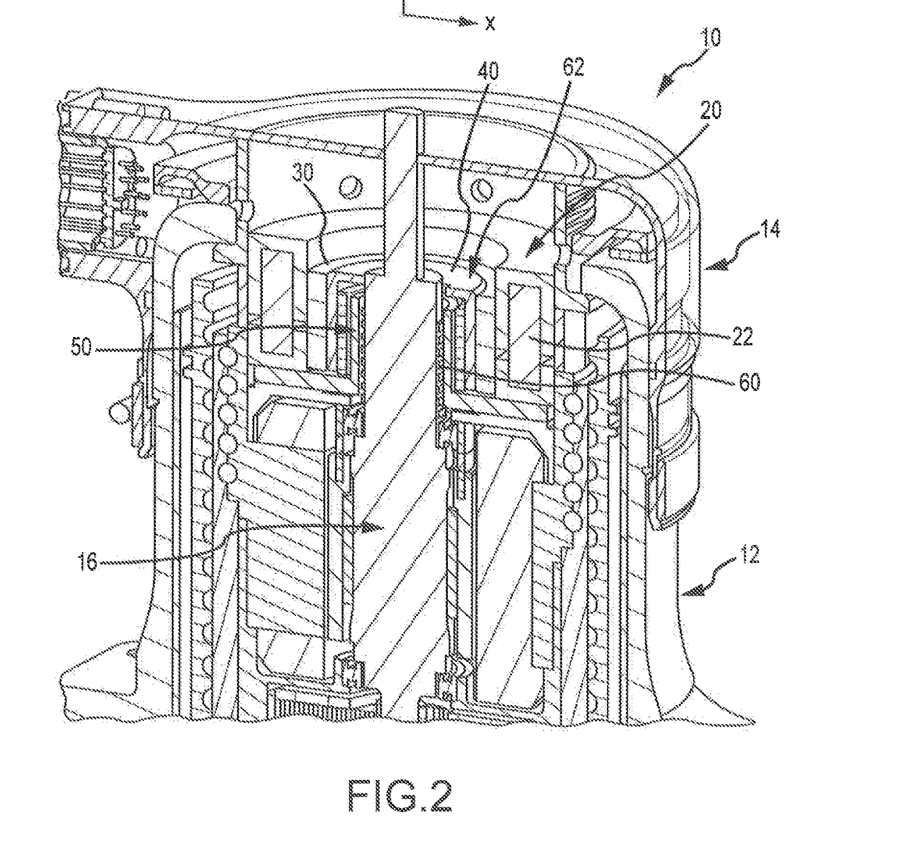
FIG. 2 illustrates a perspective cross-sectional view of a portion of an electric motor actuator in accordance with various embodiments.

In various embodiments, spring 60 may comprise one or more spring tangs. For example and as shown in FIG. 1A, spring 60 may comprise a first spring tang 62 and a second spring tang 64. Spring 60 may further comprise a first end associated with first spring tang 62 and/or a second end associated with second spring tang 64. First spring tang 62 may be retained, installed, and/or otherwise captured in a structure of EMA 10 (e.g., an actuator housing 12 as shown in FIG. 2 and/or other suitable structure). Second spring tang 64 may be retained, installed, and/or otherwise captured in a structure of EMA 10 (e.g., rotor cup 40 and/or other suitable structure).

In various embodiments, spring 60 may be a wrap spring. In this regard, spring 60 may define a channel. Shaft 16 may be installable through the channel of spring 60. The channel defined by spring 60 may be any suitable diameter to accommodate shaft 16. In other embodiments, the shaft may receive an intermediate friction element (e.g., a sleeve) that is rotatably locked with the shaft and engaged by the spring on its outside diameter. In various embodiments, spring 60 may be actuated and/or biased in any suitable direction (e.g., clockwise or counter-clockwise), to open and/or constrict the channel defined by spring 60. In this regard, spring 60 may be configured to exert a force (e.g., a radial force perpendicular to the x-axis and generally in the plane of the y-axis) on shaft 16. This force may be a binding force. For example, this binding force may limit, minimize, and/or prevent motion of shaft 16 under various operating parameters In various embodiments, magnets 30 may be operatively coupled or affixed to rotor cup 40. Moreover, magnets 30 may be configured to interact magnetically with stator 20. Rotor cup 40 and stator 20 may be fabricated from ferromagnetic materials and/or more generally, from materials with a relative magnetic permeability that is greater than one. More specifically, stator 20 may be coupled to and/or in electronic communication with a power source. In response to the power source being engaged, stator 20 may create an electromagnetic field that causes magnets 30 to bias in a direction (e.g., clockwise or counter-clockwise, as shown in FIG. 1B-1D. Moreover, stator 20 may comprise one or more mechanical stops (e.g., stop 21, stop 23, and/or the like). These mechanical stops may be configured to control the rotation of magnets 30, rotor cup 40 and/or spring 60 over a predetermined range (e.g., from approximately 15° to approximately 75° as shown in FIGS. 1C and 1D, respectively). To illustrate the rotational capability a reference line H (which is included for reference and not as an indication of any associated structure) is included in FIGS. 1B-1D, to show the predetermined range defined by the mechanical stop. Moreover, in light of the present disclosure, it should be appreciated that the mechanical stops may be installed in an electric motor actuator such that they mechanical stops interact with any number of components including, for example, stator 20, rotor cup 40, spring 60, and/or the like. As noted above the second tang 64 of spring 60 may be coupled, attached, and/or installed within rotor cup 40. The actuation of magnets 30, which is coupled to rotor cup 40, may cause spring 60 to bias in a pre-determined direction.

The quantity and dimensions of magnets 30 (as shown in FIG. 2) may be chosen to produce a magnetic reluctance torque that varies with angular position. In various embodiments and with reference to FIG. 4, line I illustrates an exemplary magnetic reluctance torque as a function of angular position of rotor cup 40 with no current applied to coil 22. Line J shows an exemplary torque as a function of angular portion of rotor cup 40 with a negative current applied to coil 22. Line K shows an exemplary torque as a function of angular portion of rotor cup 40 with a positive current applied to coil 22. Mechanical stops 421 and 423 are also shown at exemplary angular positions (e.g., approximately 15° and approximately 75°) to define a magnetic reluctance torque operating range. In this regard, the range of rotational motion of magnets 30 may be restricted to prevent reaching a position at which both the magnetic reluctance as well as the electro-dynamic torques equal zero (e.g., stable magnetic equilibrium). For example, line L illustrates the combined torque (e.g., the combined torque illustrated by line I and K) over the operating range defined by mechanical stops 421 and 423 and in response to a positive current being applied. Line M illustrates the combined torque (e.g., the combined torque illustrated by line I and J) over the operating range defined by mechanical stops 421 and 423 and in response to a negative current being applied. The number of magnets and the number of stator teeth may be chosen to be of equal count and size in order to maximize the achievable reluctance torque and produce at the same time electro-dynamic torques of sufficient magnitude and polarity to rotate rotor cup 40 (as shown in FIG. 2) from one mechanically restricted position (e.g., a position associated with mechanical stop 421) to the opposite mechanically restricted position (e.g., a position associated with mechanical stop 423) and back to the first position.

In various embodiments, FIG. 2 shows a perspective cross-sectional view of a portion of EMA 10 and includes x-y axes for reference. First spring tang 62 of spring 60 is coupled to housing 12 (as shown in FIG. 1A). Second spring tang 64 of spring 60 is coupled to rotor cup 40 (as shown in FIG. 1A). As such and in response to magnets 30 being biased and/or rotated by stator 20 (e.g., coil assembly 22 being energized), spring 60 engages shaft 16. This engagement causes shaft 16 to be constrained or otherwise prevents or minimizes movement of shaft 16. More specifically, in response to coil 22 being energized and/or powered, magnets 30 are biased in a direction causing rotor cup 40 to move and creating a torsion force from spring 60 on shaft 16. In this regard, the torsion force may be created because second tang 64 is coupled to rotor cup 40, which is movable and first tang 62 being coupled to an integral portion of housing 12, which is not movable.

In various embodiments and in response to coil 22 being energized to actuate magnets 30 and/or rotor cup 40, spring 60 is rotated to constrict, bind, and/or otherwise minimize the motion of shaft 16. In various embodiments and with reference to FIGS. 5A-5D, EMA 10 (as shown in FIG. 2) may comprise a stator 20 may be an assembly comprising a first portion 120 (e.g., a top stator housing) and a second portion 220 (e.g., a bottom stator housing). First portion 120 and second portion 220 may define a channel or hollow cavity. Coil 22 may be installable in, contained and/or otherwise at least partially surrounded by first portion 120 and second portion 220. Stator 20 may have a generally cylindrical shape and may have an inner diameter and an outer diameter. Rotor cup 40 and magnets 30 (e.g., magnets 30-1, 30-2, 30-3, 30-4) may be installable in stator 20 within the inner diameter. EMA 10 may comprise any suitable number of magnets 30 (e.g., two (2) magnets, four (4) magnets, and/or any suitable number of magnets).

In various embodiments, magnets 30 (e.g., magnets 30-1, 30-2, 30-3, 30-4) may be installed or operatively coupled to rotor cup 40 in any suitable arrangement. More specifically, magnets 30-1, 30-2, 30-3, 30-4 may be installed to rotor cup 40 with an alternating North-South magnetic pattern. In this regard, the direction of the magnetic flux emanating from magnets 30 alternates its direction between adjacent magnets. In order to secure magnets 30 to rotor cup 40, the magnets may be bonded to rotor cup 40. Magnets 30 may also be retained by a band or sleeve and/or other suitable material with non-magnetic properties that extends across the outside diameter of magnets 30. In other embodiments, the magnets may also be retained to the rotor by means of mechanical interlocking features (e.g. dovetails) or in addition be completely embedded in epoxy or other suitable non-magnetic formable materials.

Figure 4:
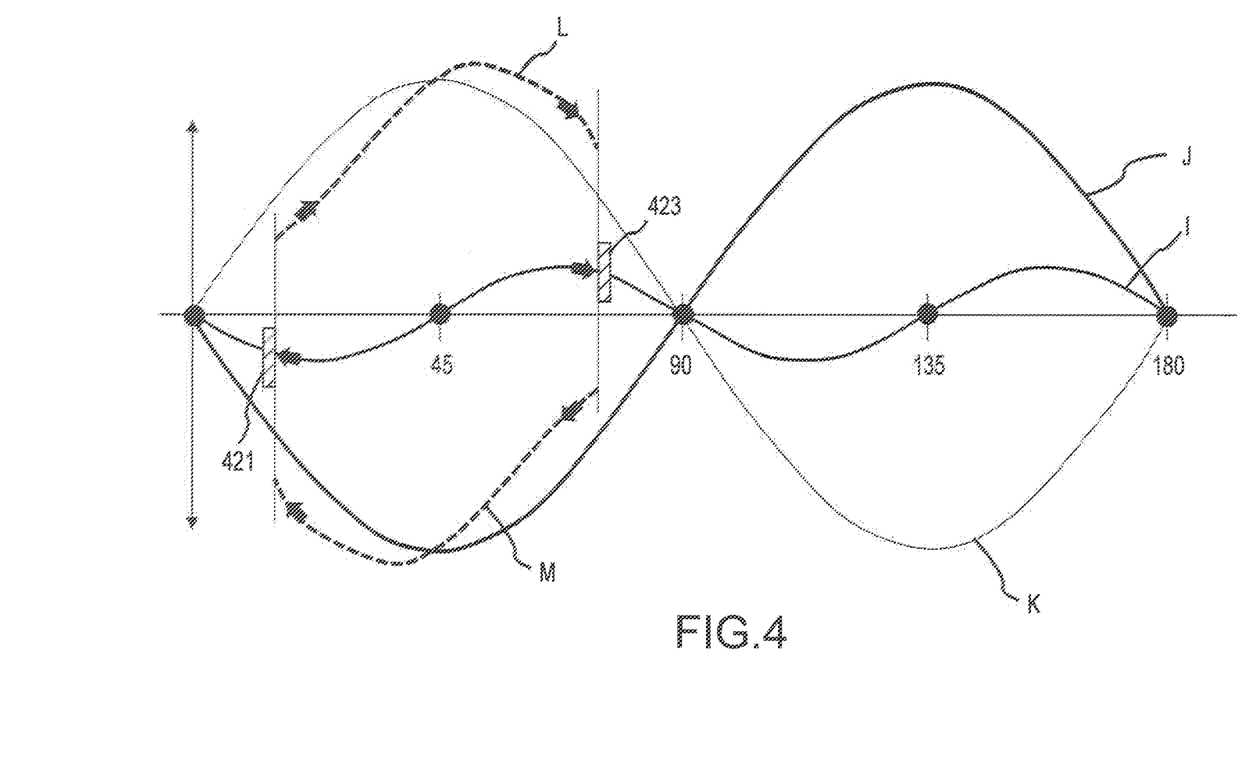
FIG. 4 illustrates various exemplary torque curves of a bi-stable electric motor actuator in accordance with various embodiments.
Figure 5A:
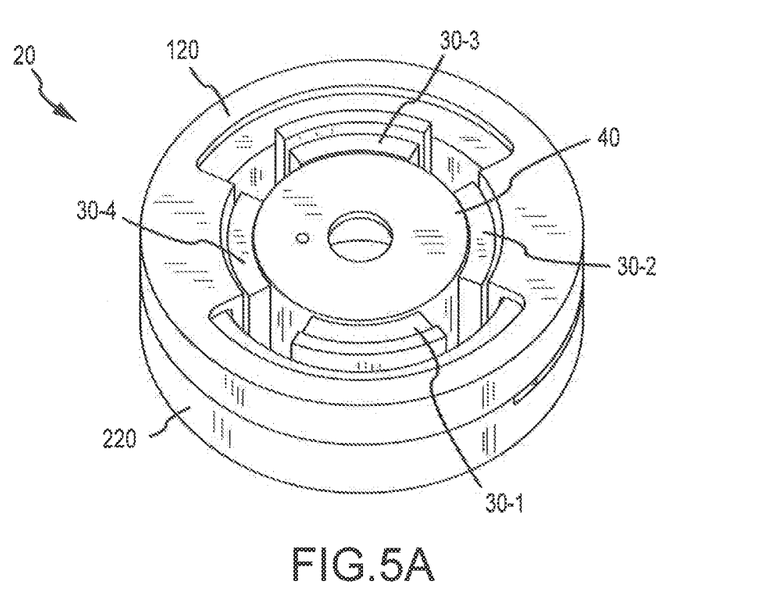
FIG. 5A-5D illustrate various perspective views of an exemplary stator assembly and associated components in accordance with various embodiments.
Figure 5B:
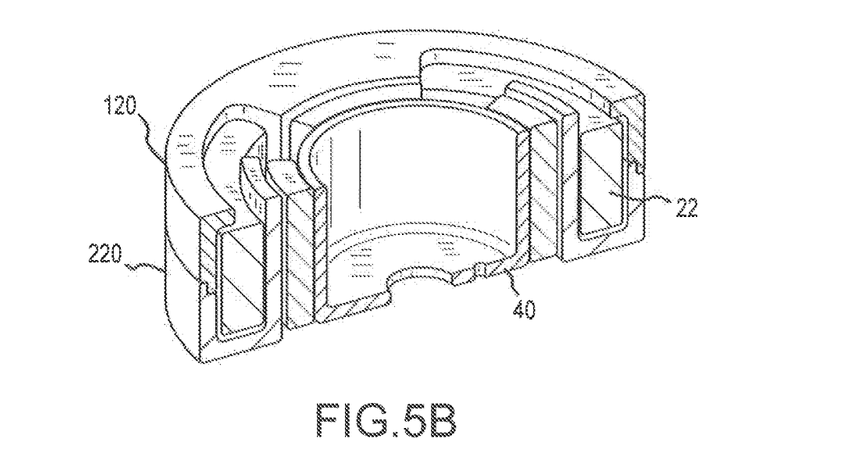
Figure 5C:
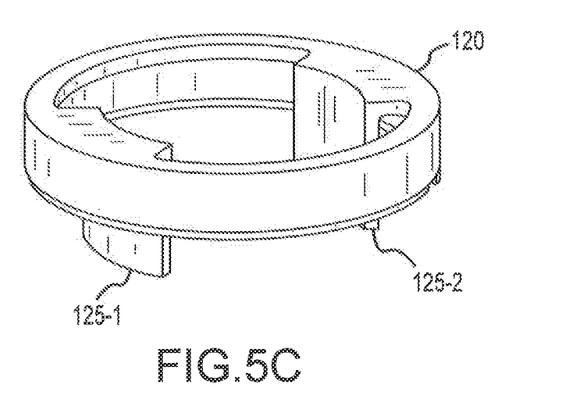
Figure 5D:
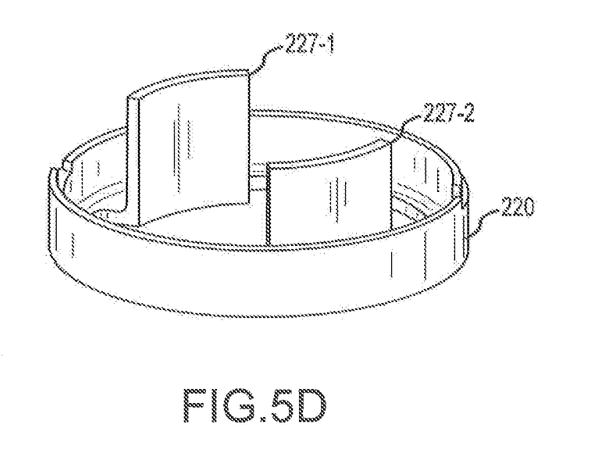

In various embodiments, first portion 120 may comprise one or more pole teeth 125 (e.g., north pole teeth 125-1 and 125-2 shown in FIG. 5C). Similarly, second portion 220 may comprise one or more pole teeth 227 (e.g., south pole teeth 227-1 and 227-2 shown in FIG. 5D). In various embodiments, pole teeth 125 and pole teeth 227 may be configured to actuate magnets 30 (e.g., in response to coil 22 being energized). In this regard, pole teeth 125 and/or pole teeth 127 may have a flux in response to coil 22 being energized. This flux may interact with the flux present in magnets 30 causing magnets 30 to move, as shown in FIG. 4.

In response to coil assembly 22 being energized, magnets 30 may be actuated causing rotor cup 40 to be actuated in a first direction (e.g., clockwise or counter-clock-wise). In this regard, spring 60 may also be actuated by virtue of second spring tang 64 being integrally coupled and/or installed in rotor cup 40 to bind and/or otherwise minimize movement of shaft 16.

In various embodiments, spring 60 may be arranged about shaft 16 such that in a free-state (e.g., where spring 60 is not biased), a small radial clearance between spring 60 and shaft 16 is maintained to minimize friction between spring 60 and shaft 16. Moreover, the winding (e.g., tightening) direction of the spring may be chosen such that the 'tight' direction or locked-state of spring 60 corresponds with the direction of rotation of shaft 16 that is associated with the release direction of EMA 10. In various embodiments, spring 60 may be wound such that the "tight" direction corresponds with the direction of anti-rotation of shaft 16 in order to bind shaft 16 to create a park brake or locked condition.

Figure 3:
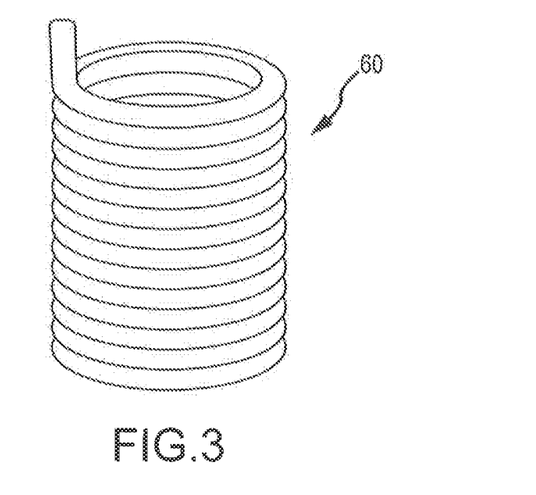
FIG. 3 illustrates an exemplary spring in accordance with various embodiments.

In various embodiments and with reference to FIG. 3, spring 60 may be any suitable spring. For example, spring 60 may be a wrap spring and/or torsion spring. Spring 60 may be fabricated from round or square spring wire (music or piano wire) or be machined from solid bar stock, or molded from plastic material. The material of spring 60 may be chosen to achieve corrosion resistance (stainless steel) and sustain its properties at low as well as high ambient temperatures ranging from approximately −65° F. to 350° F. Spring 60 may have a spring constant of approximately 0.05 Nm/rad to approximately 0.5 Nm/rad. In various embodiments, one or more components (e.g., EMA 10, stator 20, coil 22, and/or the like) may be controlled by or in electronic communication with a suitable control unit. The control unit may comprise a processor and a tangible, non-transitory storage medium. The control unit may be capable of monitoring brake and/or EMA 10 operation. The control unit may further comprise logic that is configured to reduce the load on EMA 10 during operation. For example, the control unit may be configured to monitor a time associated with a load on EMA 10. In response to an electrical load exceeding a pre-determined threshold (e.g., 20 seconds) the control unit may activate rotor cup 40 and spring 60 to lock EMA 10 and minimize the electrical load on EMA 10. This condition may occur during taxi, as the aircraft is preparing to take off, or as the aircraft is moving about the airport (e.g., moving to a gate to boarding or deplaning, moving to a maintenance area, and/or the like). In this regard, spring 60 may maintain the actuator load after de-energizing EMA 10 (park brake mode), and subsequently energizing coil 22 and actuating rotor cup 40 in the opposite direction to release spring 60 and unlock shaft 16 to remove the actuator load (e.g., service brake mode).

Figure 6:
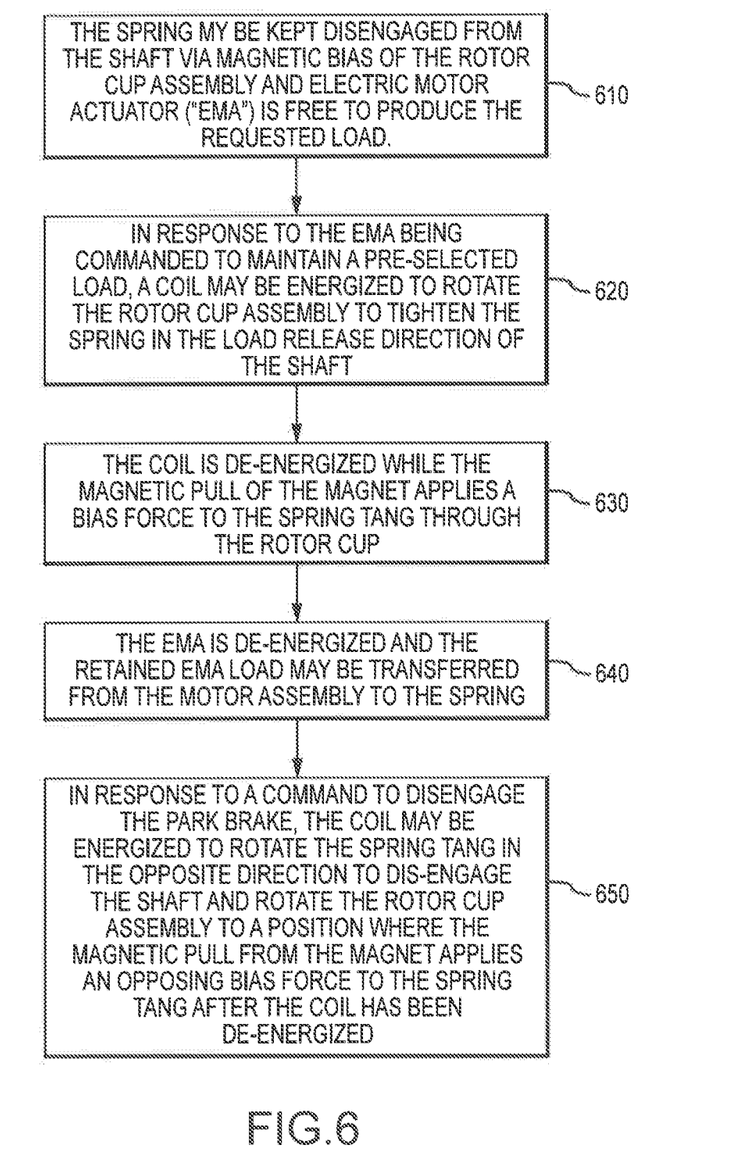
FIG. 6 is a block diagram that illustrates a method of operating an electric motor actuator in accordance with various embodiments.

In various embodiments and with reference to FIG. 6, the control unit may be capable of performing a method to engage and/or disengage a park brake in response to detecting an identified condition. The spring may be kept disengaged from the shaft via magnetic bias of the rotor cup assembly and EMA is free to produce the requested load (Step 610). More specifically, upon detecting a desired actuator load, the controller may maintain power to the EMA such that a constant load is maintained. In response to the load being maintained, the shaft speed is held at or near zero speed by allowing for occasional motor speed oscillations to occur. The spring may be maintained in an unwound state (e.g., a mechanical clearance between the spring and the shaft is maintained, either by sizing the spring inside diameter and the shaft outside diameter accordingly, or, by biasing the spring with the help of the rotor cup, stator and magnet such that a constant magnetic pull keeps the spring disengaged from the shaft). In response to the EMA being commanded to maintain a pre-selected load, a coil may be energized to rotate the rotor cup assembly to tighten the spring in the load release direction of the shaft (Step 620). More specifically, in response to energizing the coil, the rotor cup rotates one end of the spring to wind the spring tight around the shaft. The coil may be de-energized while the magnetic pull of the magnet applies a bias force to the spring tang through the rotor cup (Step 630). In this regard, the wound spring locks the shaft while the permanent-magnet pull from the rotor cup maintains a constant biasing force on the spring to keep the shaft locked after the coil has been de-energized. The EMA may be de-energized and the retained EMA load may be transferred from the motor assembly to the spring (Step 640). In response to a command to disengage the park brake, the coil may be energized to rotate the spring tang in the opposite direction to disengage the shaft and rotate the rotor cup assembly to a position where the magnetic pull from the magnet applies an opposing bias force to the spring tang after the coil has been de-energized (Step 650).

In various embodiments, the park brake mode may be activated to hold a vehicle (e.g., an aircraft in a stationary position when the aircraft is at rest (e.g., during overnight storage). The park brake mode may be activated to hold a vehicle stationary during a start, warm-up, inspection or service. The park brake mode may also be activated during flight in an aircraft application to avoid vibrational wear to EMA 10 and/or other brake system components.

In various embodiments, park brake systems described herein may provide overall cost savings as compared to typical park brake systems. Moreover, the park brake systems described herein may occupy a substantially reduced size envelope and mass of typical park brake systems.

In various embodiments, while the park brake systems described herein have been described in the context of aircraft applications; however, one will appreciate in light of the present disclosure, that the park brake assemblies described herein may be used on various other vehicles such as, for example, trains. Moreover, the park brake systems described herein may be employed with any suitable electric motor actuator in any installation to create a bi-stable locked condition.

Thus, in various embodiments, the park brake systems described herein provide a cost effective, reliable, bi-stable locking system for electric motor actuators.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electric motor actuator, comprising:
   a shaft;
   a housing;
   a rotor cup rotatably installed about at least a portion of the shat;
   a spring installable on the shaft, the spring comprising a first spring tang fixed to an integral portion of the housing and a movable second spring tang coupled to the rotor cup;
   a magnet coupled to the rotor cup; and
   a stator comprising a coil, wherein the rotor cup rotates in a first direction in response to the coil being energized and biasing the magnet, wherein the spring tightens on the shaft in response to the rotor cup rotating the second spring tang, and wherein the rotor cup rotates the second spring tang in a second direction in response to the coil being energized, allowing the spring to release tension on the shaft, the first direction being different from the second direction.

2. The electric motor actuator of claim 1, wherein the rotor cup is installable in the housing and wherein the rotor cup is rotatable with respect to the housing.

3. The electric motor actuator of claim 1, wherein the rotor cup is configured to surround at least a portion of the shaft.

4. The electric motor actuator of claim 1, wherein the stator comprises a plurality of pole teeth, wherein a first portion of the plurality of pole teeth are configured to emit a first flux in response to a first condition and wherein a second portion of the plurality of pole teeth are configured to emit a second flux in response to a second condition.

5. The electric motor actuator of claim 1, wherein the coil is energized in response to a load on the electric motor actuator being above a predetermined threshold.

6. The electric motor actuator of claim 5, further comprising a first mechanical stop and
   a second mechanical stop, the first mechanical stop and the second mechanical stop installed in the electric motor actuator to prevent the magnet from reaching a magnetically stable condition.

7. A method, comprising:
   monitoring an electric motor actuator;
   detecting a load on the electric motor actuator;
   energizing a coil assembly in response to the load being above a predetermined threshold;
   actuating a rotor cup situated in a housing in response to energizing the coil assembly in a first direction, wherein the rotor cup is coupled to a movable second spring tang of a spring and rotates the second spring tang to constrict a shaft to lock the electric motor actuator, a first spring tang being fixed to the housing and
   energizing the coil assembly to cause the rotor cup to rotate the second spring tang in a second direction, allowing the spring to release tension on the shaft, the first direction being different from the second direction.

8. The method of claim 7, wherein the predetermined threshold is time.

9. The method of claim 7, wherein the spring is a wrap spring installed on the shaft.

10. The method of claim 7, wherein energizing the coil assembly actuates a magnet that is coupled to the rotor cup causing the rotor cup to rotate.

\* \* \* \* \*

UNITED STATES PATENT AND TRADEMARK OFFICE
CERTIFICATE OF CORRECTION

PATENT NO. : 9,995,351 B2  
APPLICATION NO. : 15/012412  
DATED : June 12, 2018  
INVENTOR(S) : David Drennenm, Harald Klode and Kevin Rehvus Page 1 of 1

It is certified that error appears in the above-identified patent and that said Letters Patent is hereby corrected as shown below:

In Column 8 Line 12 please delete "shat" and therefore insert --shaft--

Signed and Sealed this
Twenty-eighth Day of August, 2018

Andrei Iancu
*Director of the United States Patent and Trademark Office*